(12) United States Patent
Weh et al.

(10) Patent No.: US 9,719,616 B2
(45) Date of Patent: Aug. 1, 2017

(54) LINE AND DELIVERY SYSTEM HAVING SUCH A LINE

(75) Inventors: Erwin Weh, Illertissen (DE); Wolfgang Weh, Illertissen (DE)

(73) Assignee: Erin Weh, Illertissen (DE)

( * ) Notice: Subject to any disclaimer, the term of this patent is extended or adjusted under 35 U.S.C. 154(b) by 663 days.

(21) Appl. No.: 14/347,494

(22) PCT Filed: Aug. 16, 2012

(86) PCT No.: PCT/EP2012/003484
§ 371 (c)(1),
(2), (4) Date: Jul. 22, 2014

(87) PCT Pub. No.: WO2013/045011
PCT Pub. Date: Apr. 4, 2013

(65) Prior Publication Data
US 2014/0332107 A1 Nov. 13, 2014

(30) Foreign Application Priority Data

Sep. 26, 2011 (DE) .................. 10 2011 114 414

(51) Int. Cl.
| | | |
|---|---|---|
| *F16L 11/10* | (2006.01) | |
| *F16L 11/20* | (2006.01) | |
| *F16L 39/00* | (2006.01) | |
| *F16L 11/08* | (2006.01) | |
| *F16L 9/04* | (2006.01) | |

(52) U.S. Cl.
CPC .............. *F16L 11/10* (2013.01); *F16L 9/042* (2013.01); *F16L 11/081* (2013.01); *F16L 11/20* (2013.01); *F16L 39/005* (2013.01)

(58) Field of Classification Search
CPC ............. F16L 39/02; F16L 11/20; F16L 11/10
USPC ...................................... 141/59, 382
See application file for complete search history.

(56) References Cited

U.S. PATENT DOCUMENTS

| | | |
|---|---|---|
| 3,543,805 A | 12/1970 | Matthews |
| 3,889,717 A | 6/1975 | Obadal et al. |
| 4,517,404 A | 5/1985 | Hughes et al. |
| 7,740,286 B2 * | 6/2010 | Weh .............. F16L 39/04 285/123.1 |
| 2008/0134692 A1 * | 6/2008 | Crowley ........... F16L 55/0336 62/50.7 |

FOREIGN PATENT DOCUMENTS

| | | |
|---|---|---|
| DE | 1965010 | 4/1967 |
| DE | 2832763 | 7/1980 |

(Continued)

*Primary Examiner* — Timothy L Maust
*Assistant Examiner* — Timothy P Kelly
(74) *Attorney, Agent, or Firm* — Pitts & Lake, PC

(57) ABSTRACT

The present general inventive concept, in some of its many example embodiments, relates to a line, in particular for the conduction of gaseous media under high pressure, preferably in the range of 150 bar to 400 bar, very preferably in the range of 200 bar to 350 bar, in particular 200 bar to 250 bar, having at least one high-pressure line and at least one gas recirculation line, characterized in that the gas recirculation line is arranged, preferably coaxially, inside the high-pressure line and the gas recirculation line comprises a stabilization device, in particular in spiral form, preferably a steel spiral, very preferably a normal steel spiral or a stainless steel spiral.

18 Claims, 5 Drawing Sheets

(56) References Cited

FOREIGN PATENT DOCUMENTS

| | | |
|---|---|---|
| DE | 19546659 | 6/1997 |
| FR | 2235324 | 6/1974 |
| WO | WO98/05898 | 2/1998 |
| WO | WO2005/121626 | 12/2005 |

* cited by examiner

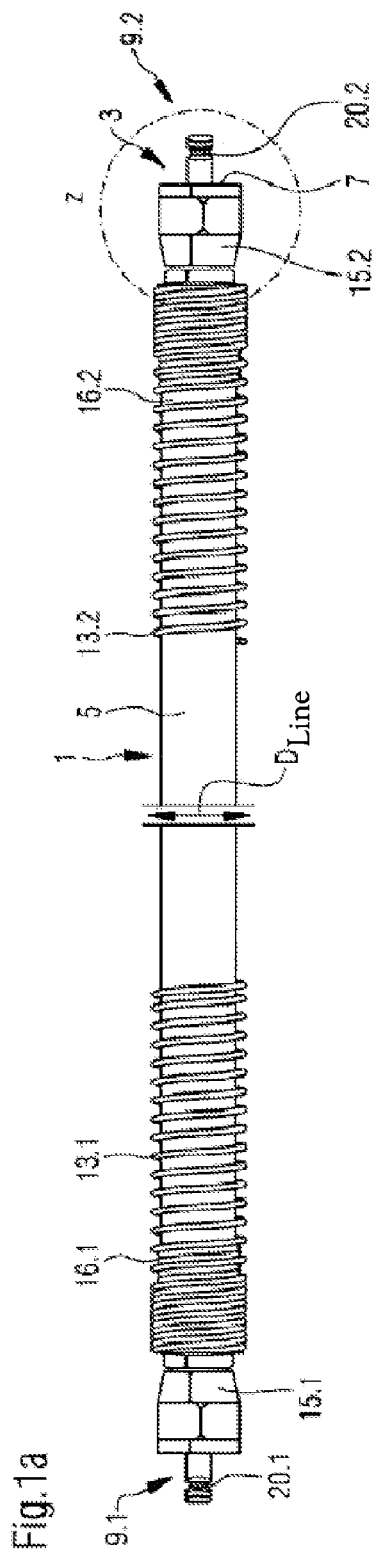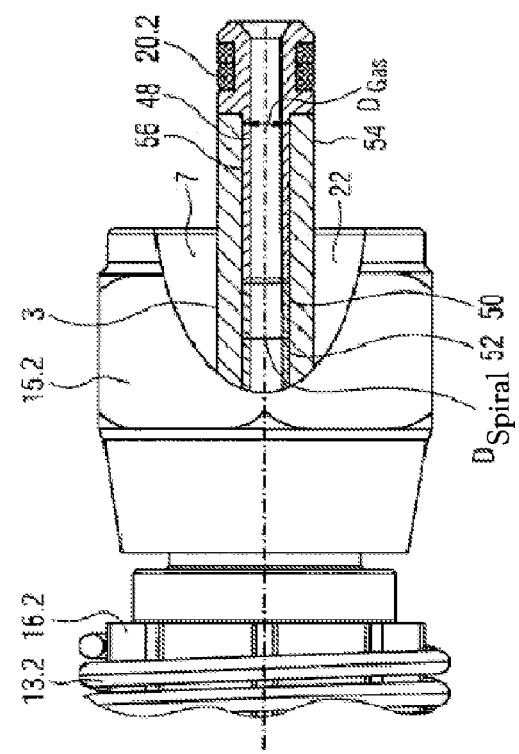
Fig.1a
Fig.1b

LINE AND DELIVERY SYSTEM HAVING SUCH A LINE

CROSS-REFERENCE TO RELATED APPLICATIONS

This Application is a continuation of PCT/EP2012/003484 filed on Aug. 16, 2012, which claims the benefit of DE 10 2011 114 414.9, filed Sep. 26, 2011, the contents of which are both incorporated herein by reference in their entirety.

STATEMENT REGARDING FEDERALLY SPONSORED RESEARCH OR DEVELOPMENT

Not Applicable.

BACKGROUND OF THE INVENTION

1. Field of Invention

The invention relates to a high-pressure feed line and a delivery system for the delivery, in particular of a gas, e.g., natural gas or hydrogen, from a refueling facility into a container, in particular a container of a vehicle.

2. Description of the Related Art

The invention relates to a high-pressure feed line and a delivery system for the delivery, in particular of a gas, e.g., natural gas or hydrogen, from a refueling facility into a container, in particular a container of a vehicle at a refueling pressure of greater than 150 bar, preferably greater than 200 bar, in particular greater than 400 bar using such a high-pressure line. Pressures in the range of 150 bar to 400 bar, preferably 200 bar to 350 bar, in particular 200 bar to 250 bar are particularly preferred. These pressures are suitable in particular for the delivery of natural gas or hydrogen. A rapid and safe transfer of a gas from a pressure source, for example, from a refueling facility containing a gaseous medium, for example, natural gas or hydrogen, to a vehicle is to be achieved using delivery systems for gaseous media, e.g., natural gas, as described above. Simple, trouble-free operability is particularly important in this case, so that even at high refueling pressures of greater than 150 bar, greater than 200 bar, preferably greater than 400 bar, trouble-free handling is made possible, in particular in cooperation with a filling coupling. The filling coupling can be implemented as a quick-connecting coupling. In addition to the high pressures, a characteristic of such delivery systems or lines, respectively, is also the extreme temperature ranges in the plus and minus range of −50° C. to +120° C., in particular −40° C. to +85° C., under which the gaseous media, for example, natural gas, are guided into a container, in particular a vehicle tank.

In general, the filling coupling is connected to the refueling facility via a line, comprising at least one high-pressure line. The gas is conducted at high pressure from the refueling facility to the filling coupling and then into the vehicle via the line.

Parts of delivery systems, for example, rotary feedthroughs having a gas recirculation for filling vehicle tanks or high-pressure hoses are known, for example, from WO-A-98/05898 or WO-A-2005/121626 of the applicant.

In this case, WO-A-98/05898 describes a rotary feedthrough in conjunction with a filling coupling, the filling coupling having a housing having a fluid inlet and a fluid outlet as well as multiple valves to ensure a secure seal of the filling coupling. To compensate for the twisting of the connection hose on the filling coupling, a rotary feedthrough was provided in WO-A-98/05898. A gas recirculation via a second line is also provided in WO-A-98/05898. The system of WO98/05898 had the disadvantages of the relatively large installation expenditure and installation space, since corresponding connections had to be provided in each case on the rotary feedthrough and on the hose side.

WO-A-2005/121626 again discloses a rotary feedthrough having gas recirculation. Furthermore, WO-A-2005/121626 also discloses a line, the recirculation line being arranged coaxially to a high-pressure line in the line. However, in WO-A-2005/121626, the line is designed in such a manner that the high-pressure line extends in the interior of the line or the hose and the gas recirculation extends in the outer region of the hose.

The content of the disclosure of both WO-A-98/05898 and also WO-A-2005/121626 is incorporated in its entirety in the present application, without requiring an express reference thereto.

The hose or the line, respectively, disclosed in WO-A-2005/121626 had the disadvantage that the gas recirculation occurred in the outer region of the hose or the line, respectively. As a result, the entire hose changed its dimensions in the event of ventilation, in particular also changed in length, which resulted in leak-tightness problems. In addition, the diameter of the line or the entire hose, respectively, was very large, since the internal high-pressure line had a minimum diameter of ½ inch. The weight, the size, and the difficulty in handling caused thereby of the hose according to WO-A-2005/121626 resulted as disadvantages therefrom.

A line for lower pressures is known from U.S. Pat. No. 4,517,404, in which a second line having smaller diameter is guided in the interior of a first line having large diameter. Both lines can transport different fluids. The line having large diameter is connected to a vacuum source and a liquid, for example, water, is conducted in the internal line. In U.S. Pat. No. 4,517,404, the line having large diameter, i.e., the external line, comprises a spiral-shaped reinforcement, in contrast thereto, the internal line is a non-reinforced line made of an elastomeric material.

A hose assembly having a support spiral is known from DE-C-28 32 763. The hose shown in DE-C-28 32 763 is a thin-walled hose for low pressures. In order to prevent buckling of such a hose because of the thin hose wall, DE-C-28 32 763 proposes a support coil lying inside the hose. Because of the thin wall, the hose known from DE-C-28 32 763 is not suitable for high pressures.

DE-C-195 46 659 describes a device for refueling a vehicle, liquid cryogenic fuel being conveyed from a pressurized conveyor tank of a vehicle into the storage container of a vehicle. The cryogenic fuel is preferably LNG or methane and is supplied in the liquid phase to the storage container. This is performed at low pressures or normal pressure and very low temperatures, preferably of −163° C.

U.S. Pat. No. 5,386,858 discloses a delivery system for liquid fuels, e.g., diesel fuels, the hose assembly comprising a first line having large diameter and a second line, lying inside the first line, having small diameter. The liquid fuel is conveyed from the storage container to the fuel nozzle in the internal second line. The first line having large diameter is used to exhaust fuel gases or fuel vapors. The delivery system known from U.S. Pat. No. 5,386,858 is in the field of conventional liquid fuels and is not suitable for an application for gases, which are guided under high pressure from a storage vessel to a tank connecting piece and therefrom into a vehicle tanks.

BRIEF SUMMARY OF THE INVENTION

The object of the invention is to avoid the above-mentioned disadvantages of the prior art and to provide a line or a hose, respectively, for a delivery system, in particular for gaseous media, for example, natural gas or hydrogen, which avoids the disadvantages of the prior art.

In particular the line or the supply hose, respectively, is also to allow a reliable conduction of gaseous media such as natural gas or hydrogen at very high pressures of greater than 150 bar, in particular greater than 200 bar, preferably greater than 400 bar, in particular in the range of 150 bar to 400 bar, preferably 200 bar to 350 bar, in particular 200 bar to 250 bar. Furthermore, it is also to be durable during refueling at low temperatures in the range of −50° C. to +120° C., preferably −40° C. to +85° C. Further requirements are low weight, small dimensions, and easy handling capability. In particular, the line is to allow a refueling device having simple construction, which can be operated by customers similarly to conventional refueling devices for liquid fuels.

This object is achieved according to the invention in that a line is provided, in particular for conducting a gaseous medium such as natural gas or hydrogen, for example, from a refueling facility into a container, in particular a container of a vehicle at a refueling pressure of greater than 150 bar, in particular greater than 200 bar, preferably greater than 400 bar, in particular in the range of 150 bar to 400 bar, preferably 200 bar to 350 bar, in particular 200 bar to 250 bar, having at least one high-pressure line and one gas recirculation line, the high-pressure line and the gas recirculation line being arranged coaxially one inside the other. It is provided according to the invention that in such an assembly, the gas recirculation line is arranged in the interior of the high-pressure line and the gas recirculation line has a stabilization device.

The stabilization device which is arranged in the interior of the gas recirculation line is implemented in particular as a wire, in particular wound in spiral form, and preferably as a stainless steel spiral.

Through the provision of a stabilization device for the gas recirculation line according to the invention, the pressure applied to the high-pressure line is prevented from deforming the gas recirculation line or, in the extreme case, even blocking it.

The stabilization device is thus used for the purpose of absorbing the pressure which is externally applied by the high-pressure line to the gas recirculation line and stabilizing the gas recirculation line. In contrast to U.S. Pat. No. 4,517,404, in the invention, the internal line is provided with a stabilization device.

In contrast, the spiral-shaped reinforcement in U.S. Pat. No. 4,517,404 is provided on the external line and is used, as in DE-C-28 32 763, as a buckle protection of the thin-walled hoses.

Through the coaxial arrangement of the gas recirculation line within the high-pressure line, the line can be smaller than in the prior art, in which the high-pressure line was arranged internally and the gas recirculation line was arranged externally. The diameter of the entire line having internal gas recirculation line then corresponds to the line diameter of only the high-pressure line of ½ inch, for example, as is known from WO-A-2005/121626. The total diameter of the line is therefore significantly reduced in relation to the line according to WO-A-2005/121626.

This prevents twisting and reduces the weight of the line, which is arranged between the filling coupling and the storage container. A further advantage, in addition to the weight reduction, is the simpler handling capability and reduction of the danger of twisting. The line, which is reduced in total diameter in relation to the hose known from WO-A-2005/121626, allows a refueling device having simple construction for natural gas and/or hydrogen, which can be operated by the customer similarly to a conventional liquid fuel refueling device, e.g., for diesel or gasoline fuel. In particular, this affects the handling capability and the weight.

In addition, the invention prevents dimension changes of the line occurring if, as in the prior art, a gas surge is applied to the gas recirculation line, for example, by the gas recirculation.

It is particularly preferable if the stabilization device is arranged, in particular in spiral form, in the interior of the gas recirculation line. Through the arrangement of the stabilization device, for example, a spiral-shaped wire in the interior of the gas recirculation line, it is ensured that a gas is only applied thereto only briefly, specifically when the ventilation is carried out via the gas recirculation line.

It is particularly preferable if the stabilization device is designed as somewhat smaller in diameter than the diameter of the gas recirculation line. In such a case, the stabilization device can be laid loosely in the gas recirculation line. This allows easy replacement, for example, in the event of wear.

A particularly suitable material both for strength and also for the corrosion resistance for the stabilization device, in particular in wire form, is a stainless steel.

It is particularly preferable if the line corresponds in its total diameter to the diameter of a high-pressure line, for example, of ½ inch, and the gas recirculation line has a gas recirculation line diameter which is in the range of 3.5 mm to 4.5 mm, i.e., corresponds to approximately half of the diameter of the high-pressure line, and the stabilization device has a somewhat smaller diameter than the gas recirculation line, whereby the stabilization device can be laid loosely in the gas recirculation line. The diameter of the entire line, or in the present case the high-pressure line internal diameter (Dline) is particularly preferably between ¼ inch and ¾ inch, in particular between ⅜ inch and ⅝ inch.

Lines having a diameter of the entire line of less than ¼ inch, in particular less than ⅜ inch, or greater than greater than ¾ inch, in particular greater than ⅝ inch, would also fundamentally be conceivable, but multiple problems would result therefrom.

If the diameter of the entire line or the high-pressure line internal diameter is less than ¼ inch, the problem results that the remaining line cross-section for guiding the gaseous medium, natural gas or hydrogen here, in the gas recirculation line is so small that a sufficient flow rate for refueling is no longer provided, since the diameter of the internal gas recirculation hose cannot be selected as arbitrarily small because of the required wall thicknesses at the applied high pressures of greater than 150 bar.

The required flow rate can be provided if the total diameter is selected as larger, however, if the diameter or the high-pressure internal line diameter is greater than ¾ inch, in particular greater than ⅝ inch, the line becomes so heavy and inflexible that refueling is practically no longer possible.

Surprisingly, for a diameter of the entire hose or the high-pressure internal line diameter in the range ¼ inch to ¾ inch, preferably in the range ⅜ inch to ⅝ inch very preferably approximately ½ inch, the required flow rate for a refueling can be provided, on the other hand, the hose is still sufficiently flexible and light.

In addition, the line can have a spiral-shaped wire apparatus on the outer side as a type of buckle protection.

Through the line according to the invention, a line having gas recirculation line and high-pressure line arranged coaxially one inside the other is provided, in which the gas recirculation line lying inside the high-pressure line is protected from deformation under high pressures with the aid of a stabilization device, in particular in the form of a spiral spring, preferably made of metal, for example, stainless steel.

In addition to the line, a delivery system for gaseous media having such a line is particularly preferably provided.

The delivery system has a filling coupling and a container, from which the gaseous medium is provided via the line according to the invention to the filling coupling at high pressure and at low temperatures, as previously specified.

In order to connect the filling coupling, in which typically the high-pressure line is provided externally and the gas recirculation line is provided internally, and the container to the line according to the invention, it is provided that the line is connected using connection couplings to both the filling coupling and also the container, the connection couplings having at least one connection bore in the form of diagonal bores, so that the gas recirculation line, which is located in the interior of the high-pressure line, of the line according to the invention can be connected to the gas recirculation line of the filling coupling or the container, respectively. The diagonal bores are also used for the purpose of connecting the external high-pressure line to the high-pressure line of the filling coupling or that of the container. The connection coupling is preferably implemented in the form of a rotary feedthrough.

A rotary feedthrough is disclosed, for example, in WO-A-2005/121626, whose disclosure is incorporated in its entirety in the present application.

A filling coupling having integrated rotary feedthrough is disclosed in WO-A-98/05898, the content of whose disclosure is incorporated in its entirety in the present application.

The delivery system according to the invention is used above all at fueling stations for vehicles, in particular motor vehicles.

BRIEF DESCRIPTION OF THE SEVERAL VIEWS OF THE DRAWINGS

The invention is to be explained and described in greater detail hereafter on the basis of the attached figures, without restriction thereto.

In the figures:

FIGS. 1a-1b: show an embodiment of a line according to the invention in the form of a hose having internal gas recirculation line and external high-pressure line;

DETAILED DESCRIPTION OF THE INVENTION

Figure 2:
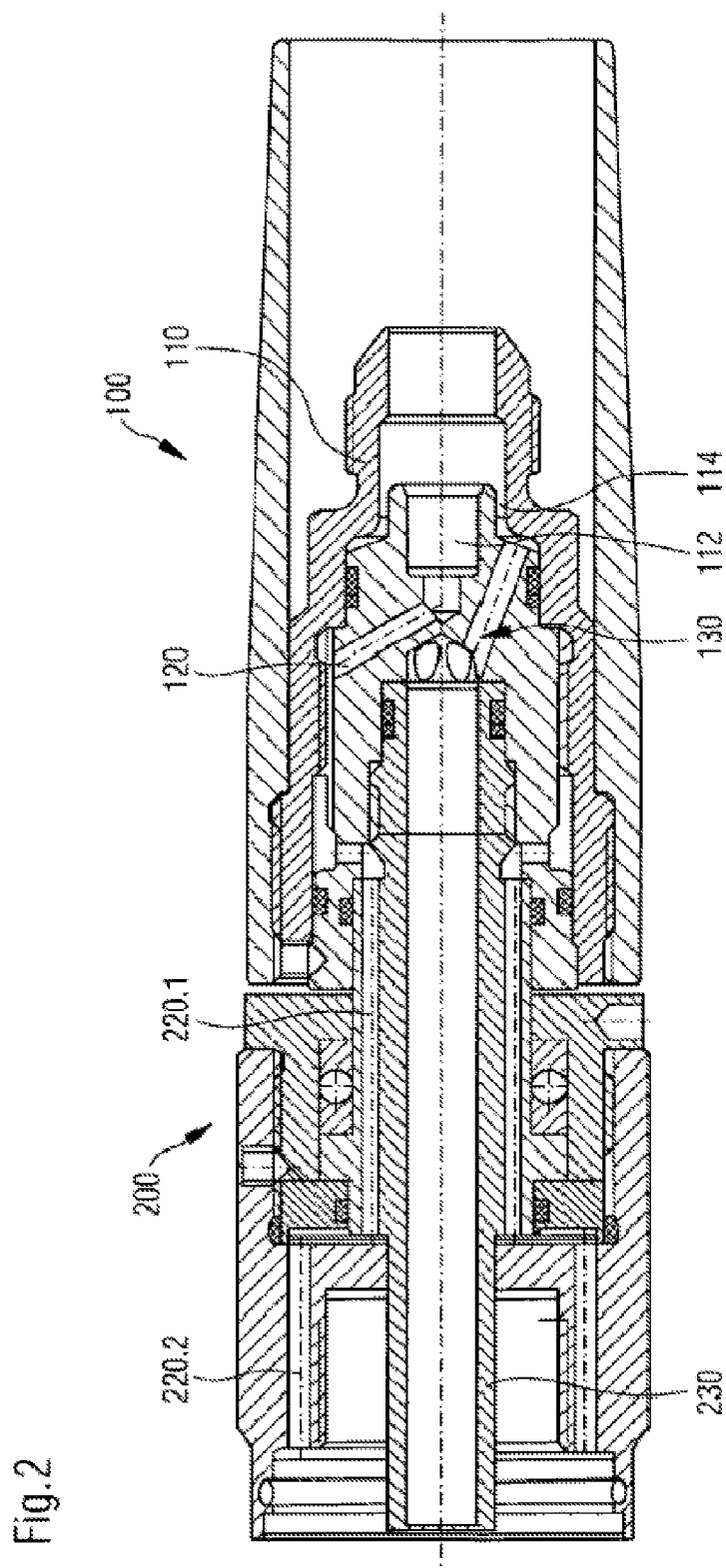
FIGS. 2 and 3: show the embodiment of a connection coupling on a filling coupling, implemented as a rotary feedthrough having internal high-pressure line and external gas recirculation line arranged coaxially one inside the other.

The present general inventive concept, in some of its many example embodiments, relates to a line, in particular for the conduction of gaseous media under high pressure, preferably in the range of 150 bar to 400 bar, very preferably in the range of 200 bar to 350 bar, in particular 200 bar to 250 bar, having at least one high-pressure line and at least one gas recirculation line, characterized in that the gas recirculation line is arranged, preferably coaxially, inside the high-pressure line and the gas recirculation line comprises a stabilization device, in particular in spiral form, preferably a steel spiral, very preferably a normal steel spiral or a stainless steel spiral.

FIGS. 1a and 1b show a side view of a line 1 according to the invention for a delivery system, as is described in greater detail in FIGS. 2 to 5. The line 1 is implemented according to the invention in such a manner that a recirculation line 3, in particular a gas recirculation line, is arranged in the interior of the line 1, the high-pressure line 7 being implemented in the line 1 between the outer wall of the hose 5 and the internal recirculation line 3. In the high-pressure line, in particular natural gas or hydrogen gas is guided at high pressure of greater than 150 bar, preferably greater than 350 bar, in particular greater than 400 bar, very preferably in the range of 150 bar to 400 bar, preferably in the range of 200 bar to 350 bar, particularly preferably 200 bar to 250 bar, into the tank (not shown) of the vehicle located on the side 9.1 of the line 1. The gas is taken from a container (not shown) on the side 9.2.

Connection parts 15.1, 15.2 are provided in the region of the connections 9.1, 9.2. The connection parts 15.1, 15.2 have a transition 16.1, 16.2 for the hose 1 and a feedthrough (not shown) for the gas recirculation line 3 lying in the hose. Seals 20.1, 20.2 are provided on the recirculation line 3. The gas recirculation line 3 has an insert 48 in the shape of a fir tree in the region of the connections 9.1, 9.2, as shown in the detail view in FIG. 1b. As a result, the gas recirculation line can be connected tightly to the provided connections of the connection couplings, as shown in FIGS. 2-5. Through the externally acting pressure, the hose is pressed so strongly into the depressions of the fir tree profile that this hose does not have to be secured further, e.g., by a hose clamp. The connection parts also have recesses 22, in which parts of the connection couplings can be inserted, as shown in FIGS. 2 to 5, to provide a leak-tight connection of the line 1 to the connection couplings. On the outer side or outer wall of the hose 1, spiral springs 13.1, 13.2 are provided in the region of the connections 9.1, 9.2 as a buckling protection as in tank hoses for liquid fuels, e.g., gasoline. This embodiment is advantageous, but not compulsory for the invention. FIG. 1b shows the region of the connection 9.2 of the line 1 according to FIG. 1a in detail. In order to stabilize the internal gas recirculation line 3 at the applied high pressures of greater than 150 bar, in particular greater than 350 bar, preferably greater than 400 bar, in particular in the range of 150 bar to 400 bar, preferably 200 bar to 350 bar, in particular 250 bar to 350 bar, as shown in FIG. 1b, a stabilization device 50 is provided on the inner side 52 of the hose 54 of the gas recirculation line. The stabilization device is preferably a wire having a diameter in the range of 0.1 mm to 1 mm. The material of the wire of the stabilization device is a metal, preferably steel, in particular stainless steel. The internal diameter Dline, which is also designated as the total diameter of the entire line or high-pressure line internal diameter, is preferably, without being restricted thereto, ½ inch. It is particularly advantageous if the internal diameter Dline is in the range ¼ inch to ¾ inch, preferably in the range ⅜ inch to ⅝ inch.

Lines having a total diameter or high-pressure line internal diameter of less than ¼ inch, in particular less than ⅜ inch, or greater than ¾ inch, in particular greater than ⅝ inch, would fundamentally also be conceivable, but multiple problems result therefrom.

If the diameter of the entire line is less than ¼ inch, the problem results that the remaining line cross-section for guiding the gaseous medium, natural gas or hydrogen here, is so small that a sufficient flow rate for refueling is no longer provided, since the diameter of the surrounding gas recirculation hose cannot be selected as arbitrarily small because of the required wall thicknesses at the applied high pressures of greater than 150 bar.

The required flow rate can be provided if the total diameter is selected as larger, however, if the diameter is greater than ¾ inch, in particular greater than ⅝ inch, the line becomes so heavy and inflexible that refueling is practically no longer possible.

Surprisingly, for a diameter of the entire hose in the range ¼ inch to ¾ inch, especially in the range ⅜ inch to ⅝ inch very preferably of approximately ½ inch, the required flow rate for a refueling can be provided, on the other hand, the hose is still sufficiently flexible and light.

The internal diameter Dgas of the gas recirculation line is preferably in the range of 3.3 min to 4.3 mm, while in contrast the external diameter Dspiral of the stabilization device 50 is in the range of 3.5 mm to 4.5 mm, so that the stabilization device 50 can be laid loosely in the interior of the gas recirculation hose. This allows a rapid replacement. Furthermore, the insert 48 having the seal 20.2 for connection to the connection part (not shown) can be recognized well in FIG. 1b. The insert 48 is in the shape of a fir tree having external ribs 56. If the hose 54 of the gas recirculation line is under pressure because of the gas guided through the high-pressure line 7, the hose automatically seals off tightly with the insert 48. The connection part 15.2, the installation 16.2, and the external spring 13.2 can also be recognized well in FIG. 1b.

Figure 3:
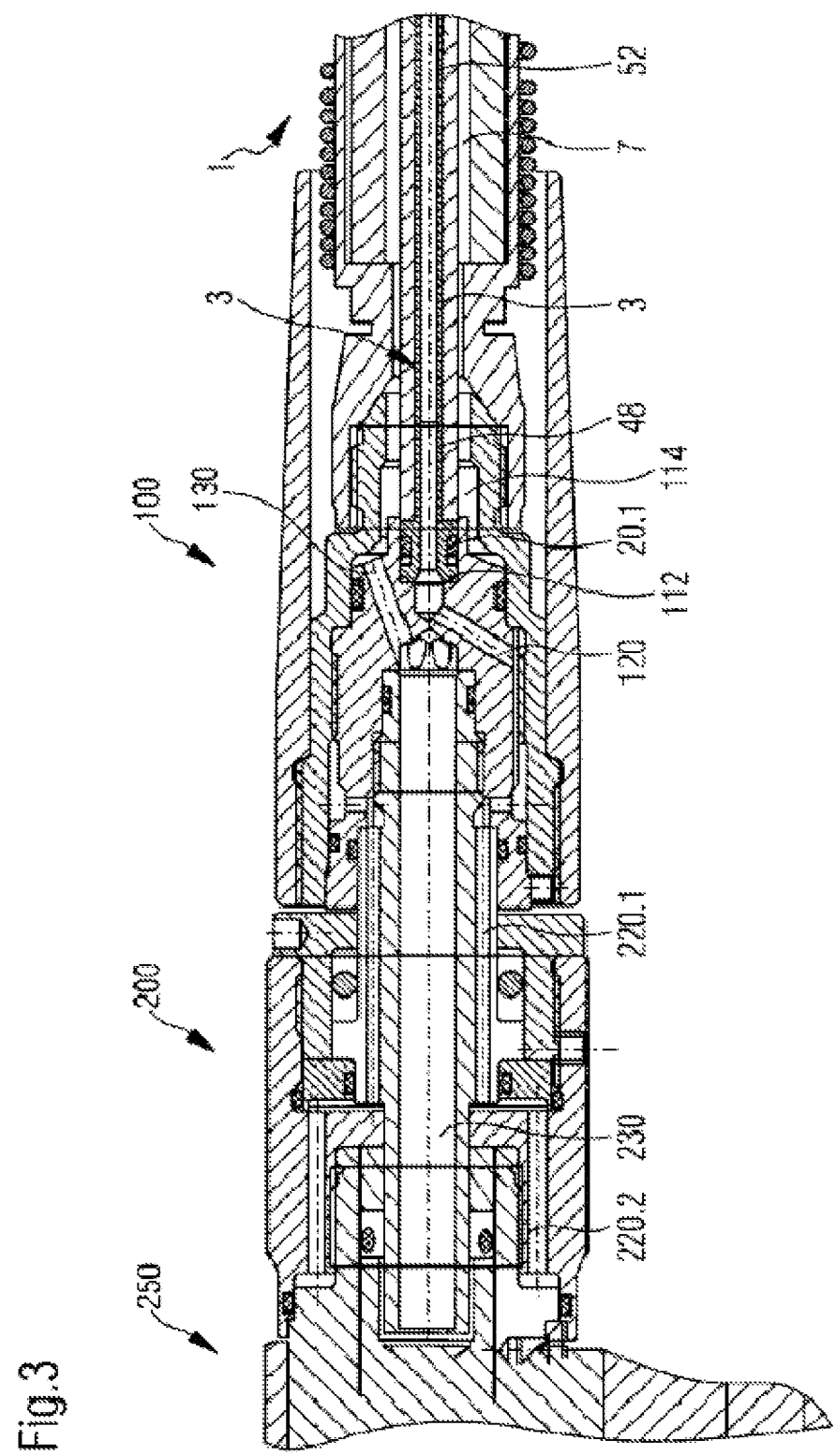

In FIG. 2 and FIG. 3, a connection coupling designed as a rotary feedthrough is shown, in which, in the rotary feedthrough, the feed line, i.e., the high-pressure line is guided coaxially in the recirculation line to connect the line according to FIGS. 1a-1b to a filling coupling (not shown) of a delivery system.

FIG. 2 shows a connection coupling 100, with which a line 1 (not shown) can be connected to a filling coupling via a rotary feedthrough 200. The connection coupling 100 in FIG. 2 is not yet connected to a hose according to FIG. 1. However, the connection coupling 100 is connected in the present case to a rotary feedthrough 200 and, adjoining thereon, to a filling coupling (not shown).

The connection coupling according to FIG. 2 has a connection region 110, which can be connected to the connection part of the hose according to FIGS. 1a-b and is designated therein with 15.1.

The connection part 110 comprises a receptacle 112 for the gas recirculation line extending in the line or the hose, respectively, according to FIGS. 1a-b, and a high-pressure line region 114.

The connection between the line shown in FIGS. 1a-b and the filling coupling with the aid of the connection coupling 100 and rotary feedthrough 200, is executed in detail in FIG. 3.

Furthermore, the connection bore(s) 120 as diagonal bore(s) can be recognized in FIG. 2, which, to discharge the recirculated gas from the recirculation line 3 lying inside the hose according to FIGS. 1a-1b, open into the external recirculation line 220.1, 220.2 of the rotary feedthrough 200, as described, e.g., in WO-A-2005/121626 A1. The diagonal bore 130 implemented in the region of the connection coupling 100 for connecting the internal high-pressure line 230 in the rotary feedthrough 200 and the filling coupling adjoining thereon to the external feedline 7 in the hose according to FIG. 1 can also be recognized.

FIG. 3 shows in detail the connection of a line 1 according to FIGS. 1a-b to the rear part of a filling coupling 300, which opens into a tank of a vehicle, and to a rotary feedthrough 200 adjoining the connection coupling 100. Identical components as in FIGS. 1a-1b and 2 are provided with the same reference numerals.

As is also clearly shown in FIG. 3, the seal 20.1 of the insert 48 of the gas recirculation line 3 engages in the opening 112 of the connection coupling 100, so that the gas recirculation line 3 is separated from the high-pressure part 114 of the connection part 100, through which gaseous medium is supplied at high-pressure from the external high-pressure line 7 of the line 1 into the internal high-pressure line 230 of the connection coupling 100 or the rotary feedthrough, respectively. The diagonal bores 120, 130 for connecting the gas recirculation line 3 to the external gas recirculation line 220.1, 220.2 of the rotary feedthrough 200 and for connecting the high-pressure line 230 of the feedthrough 200 to the high-pressure line 7 of the line 1 can be recognized clearly. Furthermore, the stabilization device 52 arranged inside the gas recirculation line 3 can be recognized clearly.

Figure 4:
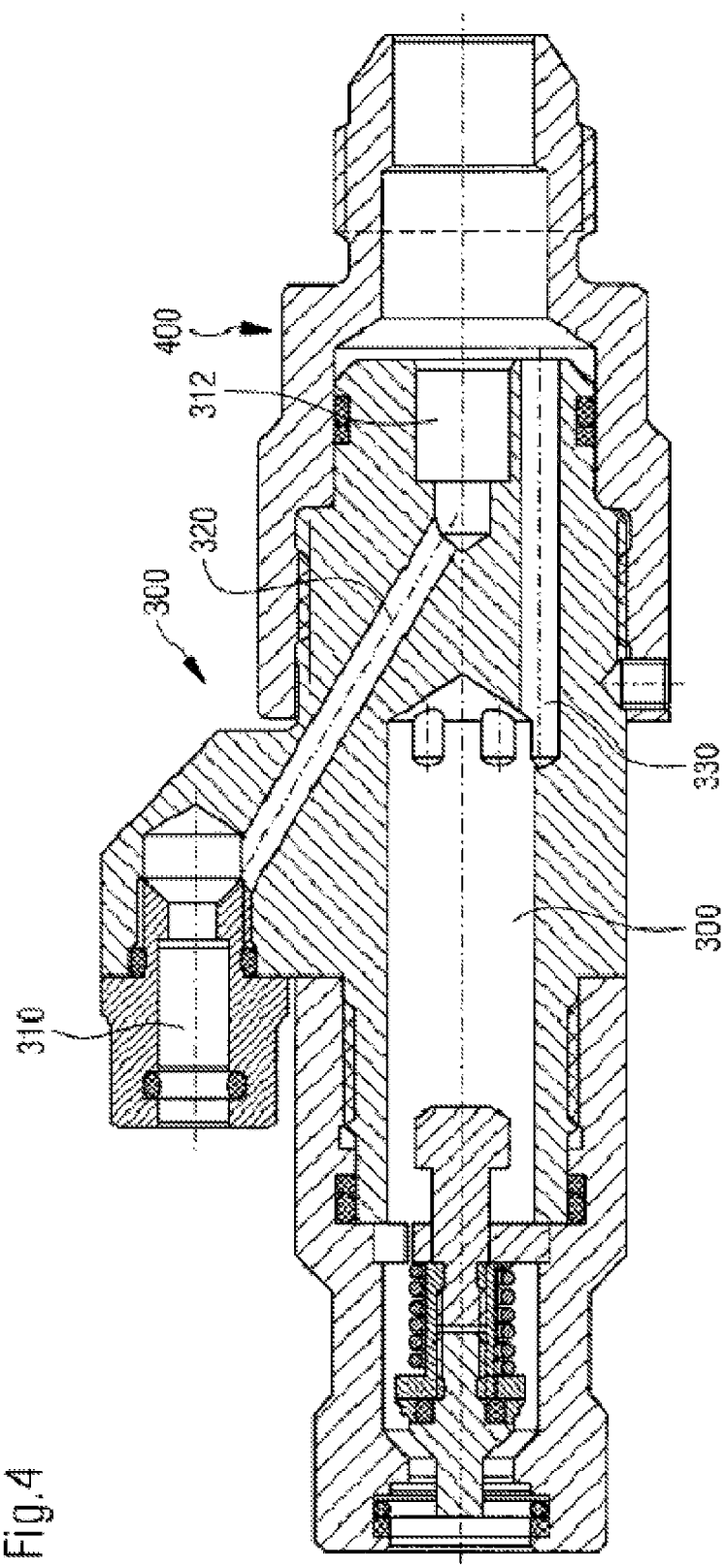
FIGS. 4 and 5: show the embodiment of a connection coupling on a container, implemented as a rotary feedthrough having separate high-pressure line and separate gas recirculation line. The above-mentioned features of the present general inventive concept, as well as other features, will become more clearly understood from the following detailed description of the present general inventive concept read together with the drawings, but without limitation thereto. The following is shown.

FIG. 4 shows a connection coupling 300 having integrated rotary feedthrough 400 according to, for example, WO-A-98/05898, the content of whose disclosure is incorporated in its entirety in this application, for supplying gas under high pressure from a storage tank (not shown).

Like the embodiment according to FIG. 3, the embodiment of the connection coupling 300 also has an diagonal bore 320. The gas recirculation line 3 is, as in FIG. 2, inserted tightly into the opening 312 and the recirculated air is guided to the recirculation line or a recirculation opening 310, which is arranged separately for the feedline for the gas under high pressure, via the diagonal bore 320. The high-pressure line 300, via which the gas is guided from a storage container (not shown) to the line 1, is connected via the bore 330 to the external high-pressure line 7 in line 1 according to FIG. 1.

Figure 5:
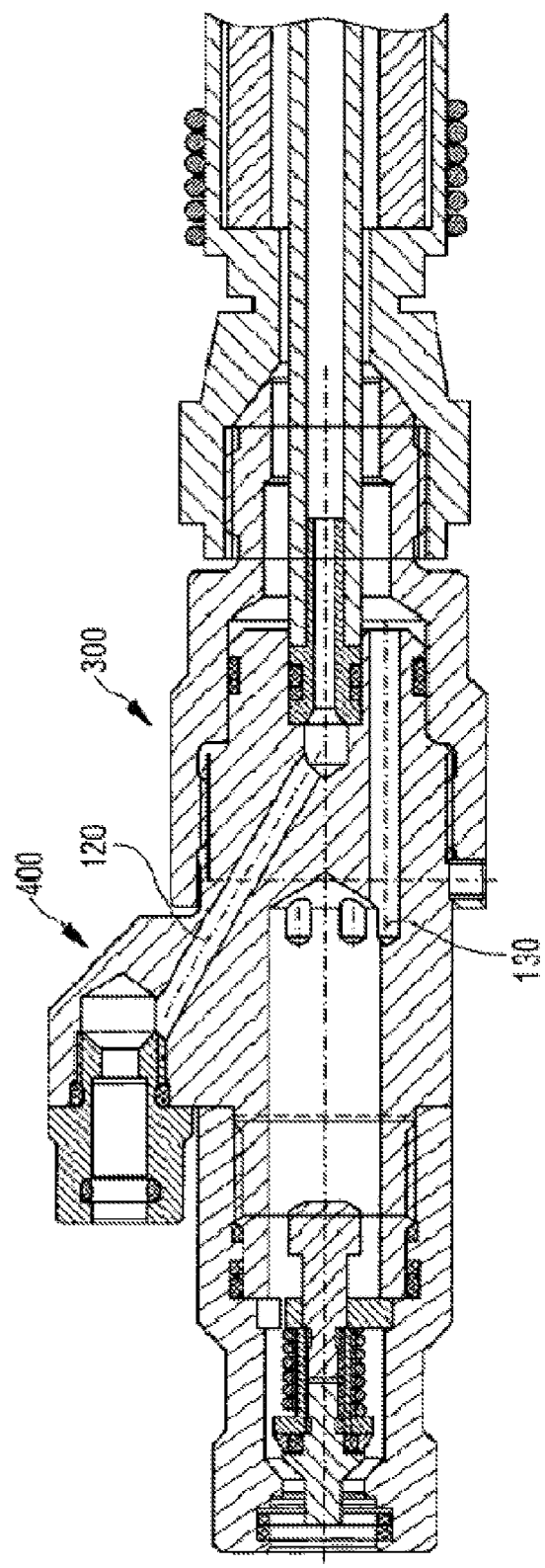

FIG. 5 shows the connection of the connection coupling 300 having integrated rotary feedthrough 400 to line 1. Line 1 is constructed according to FIGS. 1a-1b and has an internal gas recirculation line 3 in a hose 5, so that the gas under pressure, which can preferably be natural gas or hydrogen, for example, is supplied from a storage container (not shown) to the high-pressure part 7 of the line 1. Identical components as in FIGS. 1a-1b have identical reference numerals. In particular, the gas recirculation line 3 has a stabilization device, for example, a metal wire 48.

For the first time, a simply constructed line for a delivery system for gases at high pressures of greater than 150 bar is specified by the invention, which is suitable, through high reliability and universal connectability to different types of connection couplings, for connection to storage container and filling coupling. Further advantages of the line are in particular the high stability of the hose even under very high pressures and the high resistance at very low temperatures. This is also achieved in particular by the stabilization device. Furthermore, the hose has a relatively low weight, and the danger of twisting is low.

A further advantage is that it is possible using the line according to the invention to provide a delivery system, in particular a refueling device for gases, in particular for natural gas and hydrogen, which has a simple construction and can be operated by customers similarly as a conventional liquid refueling device.

In any of the foregoing embodiments, the present general inventive concept may be embodied in a line (1), in particular for the conduction of gaseous media under high pressure, preferably in the range of 150 bar to 400 bar, very preferably in the range of 200 bar to 350 bar, in particular 200 bar to 250 bar, having at least one high-pressure line (7) and at least one gas recirculation line (3), characterized in that the gas recirculation line (3) is arranged, preferably coaxially, inside the high-pressure line (7) and the gas recirculation line (3) comprises a stabilization device (48), in particular in spiral form, preferably a steel spiral, very preferably a normal steel spiral or a stainless steel spiral.

In any of the foregoing embodiments, the present general inventive concept may be characterized in that the gaseous medium is natural gas or hydrogen.

In any of the foregoing embodiments, the present general inventive concept may be characterized in that the stabilization device (48), in particular in spiral form, is arranged in the interior of the gas recirculation line (3).

In any of the foregoing embodiments, the present general inventive concept may be characterized in that the stabilization device, in particular in spiral form, is arranged loosely in the interior of the gas recirculation line.

In any of the foregoing embodiments, the present general inventive concept may be characterized in that the stabilization device (48), in particular in spiral form, comprises a metal, in particular a steel, preferably normal steel or stainless steel.

In any of the foregoing embodiments, the present general inventive concept may be characterized in that the high-pressure line (7) has a high-pressure line internal diameter (Dline) which is preferably in the range of ¼ inch to ¾ inch.

In any of the foregoing embodiments, the present general inventive concept may be characterized in that the high-pressure line internal diameter (Dline) is in the range of ⅜ inch to ⅝ inch, preferably ½ inch.

In any of the foregoing embodiments, the present general inventive concept may be characterized in that the gas recirculation line (3) has a gas recirculation line internal diameter (Dgas) which is preferably in the range of 3.5 mm to 4.5 mm.

In any of the foregoing embodiments, the present general inventive concept may be characterized in that the stabilization device (48) has a stabilization device diameter (Dspiral) which is preferably in the range of 3.3 mm to 4.3 mm.

In any of the foregoing embodiments, the present general inventive concept may be embodied in a delivery system for delivering a gaseous medium, in particular a gas from a refueling facility into a container, in particular a container of a vehicle, at a refueling pressure of greater than 150 bar, preferably greater than 200 bar, in particular greater than 400 bar, preferably in the range of 150 bar to 400 bar, in particular 200 bar to 350 bar, very particularly preferably 200 bar to 250 bar, having a filling coupling (250) and a line (1), in particular in the form of a hose (5), which is connectable between the filling coupling and the container, the line (1), in particular the hose (5), having a high-pressure line (3) and a gas recirculation line (7), which are arranged coaxially one inside the other, characterized in that the line (1) is a line according to one of the foregoing descriptions.

In any of the foregoing embodiments, the present general inventive concept may be characterized in that a connection coupling (100, 300) is provided between filling coupling (250) and line (1) and/or between line (1) and container, the connection coupling having at least one connection bore in the form of an diagonal bore (120, 130) in order to connect the recirculation line (3) lying in the interior of the line (1) to the recirculation line (220.1, 220.2) of the filling coupling and/or a gas outlet (310), and to connect the high-pressure line (7) of the line (1) to the high-pressure line (230) of the filling coupling (250) and/or of the container.

In any of the foregoing embodiments, the present general inventive concept may be characterized in that the connection coupling (100, 300) is connected to the filling coupling (250) and/or a rotary feedthrough (200, 400).

In any of the foregoing embodiments, the present general inventive concept may be characterized in that the rotary feedthrough (200, 400) comprises a gas recirculation line and a high-pressure line lying in the interior of the gas recirculation line.

In any of the foregoing embodiments, the present general inventive concept may be embodied in a use of a gas delivery system according to any of the above descriptions in gas fueling stations for vehicles, in particular motor vehicles.

In some example embodiments of the present general inventive concept, a line for the conduction of gaseous media under high pressure in the range of 150 bar to 400 bar includes at least one high-pressure line and at least one gas recirculation line, characterized in that the gas recirculation line is arranged, preferably coaxially, inside the high-pressure line and the gas recirculation line includes a stabilization device.

Some embodiments are characterized in that the gaseous medium is natural gas or hydrogen.

Some embodiments are characterized in that the stabilization device is in spiral form and is arranged in the interior of the gas recirculation line.

Some embodiments are characterized in that the stabilization device is arranged loosely in the interior of the gas recirculation line.

Some embodiments are characterized in that the stabilization device is in spiral form and comprises a metal.

Some embodiments are characterized in that the stabilization device comprises steel.

Some embodiments are characterized in that the stabilization device comprises stainless steel.

Some embodiments are characterized in that the high-pressure line has a high-pressure line internal diameter ($D_{line}$) which is in the range of ¼ inch to ¾ inch.

Some embodiments are characterized in that the high-pressure line internal diameter ($D_{line}$) is in the range of ⅜ inch to ⅝ inch.

Some embodiments are characterized in that the gas recirculation line has a gas recirculation line internal diameter ($D_{gas}$) which is in the range of 3.5 mm to 4.5 mm.

Some embodiments are characterized in that the stabilization device is in spiral form and has a stabilization device diameter ($D_{spiral}$) which is in the range of 3.3 mm to 4.3 mm.

In some example embodiments of the present general inventive concept, a delivery system for delivering a gaseous medium, in particular a gas from a refueling facility into a container at a refueling pressure of greater than 150 bar, includes a filling coupling, and a line including a hose, said hose being connectable between the filling coupling and the container, the line having a high-pressure line and a gas recirculation line, characterized in that the gas recirculation line is arranged coaxially inside the high-pressure line and the gas recirculation line includes a stabilization device.

Some embodiments further include a connection coupling between the filling coupling and the line, the connection coupling having at least one connection bore in the form of an diagonal bore in order to connect the gas recirculation line lying in the interior of the line to a recirculation line of the filling coupling and to connect the high-pressure line of the line to a high-pressure line of the filling coupling.

Some embodiments are characterized in that the connection coupling is connected to the filling coupling.

Some embodiments are characterized in that the connection coupling is connected to a rotary feedthrough.

Some embodiments are characterized in that the rotary feedthrough comprises a gas recirculation line and a high-pressure line lying in the interior of the gas recirculation line.

Some embodiments are characterized in that a connection coupling is provided between the filling coupling and the line, the connection coupling having at least one connection bore in the form of an diagonal bore in order to connect the gas recirculation line lying in the interior of the line to a gas outlet and to connect the high-pressure line of the line to a high-pressure line of the filling coupling.

Some embodiments are characterized in that a connection coupling is provided between the line and the container, the connection coupling having at least one connection bore in the form of an diagonal bore in order to connect the gas recirculation line lying in the interior of the line to a gas outlet and to connect the high-pressure line of the line to a high-pressure line of the container.

In some example embodiments of the present general inventive concept, a gas delivery system for use in a gas fueling station for motor vehicles, to deliver a gaseous medium into a container of a motor vehicle, at a refueling pressure of greater than 150 bar, includes a filling coupling, and a line including a hose, said hose being connectable between the filling coupling and the container, the line having a high-pressure line and a gas recirculation line, characterized in that the gas recirculation line is arranged coaxially inside the high-pressure line and the gas recirculation line includes a stabilization device.

Some embodiments are further include a connection coupling between the filling coupling and container of a motor vehicle, the connection coupling having at least one connection bore in the form of an diagonal bore in order to connect the high-pressure line of the line to a high-pressure line of the filling coupling.

While the present general inventive concept has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The present general inventive concept in its broader aspects is therefore not limited to the specific details, representative apparatus and methods, and illustrative examples shown and described. Accordingly, departures may be made from such details without departing from the spirit or scope of applicant's general inventive concept.

Still other embodiments will become readily apparent to those skilled in this art from reading the above-recited detailed description in view of all the drawings. It is noted that the simplified diagrams do not illustrate all the various connections and assemblies of the various components, however, those skilled in the art will understand how to implement such connections and assemblies, based on the illustrated components, figures, and descriptions provided herein.

It is also noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A line for the conduction of gaseous media under high pressure in the range of 150 bar to 400 bar, comprising:
    at least one high-pressure line and at least one gas recirculation line, wherein the gas recirculation line is arranged coaxially inside the high-pressure line, characterized in that the gas recirculation line includes a stabilization device, the high-pressure line has a high-pressure line internal diameter ($D_{line}$) in the range of approximately 6.35 mm to approximately 19.05 mm, the gas recirculation line has a gas recirculation line internal diameter ($D_{gas}$) in the range of approximately 3.5 mm up to approximately half of the high-pressure line internal diameter ($D_{line}$), and the gas recirculation line has a gas recirculation line internal diameter selected to provide a selected predetermined flow rate.

2. The line according to claim 1, characterized in that the gaseous medium is natural gas or hydrogen.

3. The line according to claim 1, characterized in that the stabilization device is in spiral form and is arranged in the interior of the gas recirculation line.

4. The line according to claim 3, characterized in that the stabilization device is arranged loosely in the interior of the gas recirculation line.

5. The line according to claim 1, characterized in that the stabilization device is in spiral form and comprises a metal.

6. The line according to claim 5, characterized in that the stabilization device comprises steel.

7. The line according to claim 5, characterized in that the stabilization device comprises stainless steel.

8. The line according to claim 1, characterized in that the gas recirculation line has a gas recirculation line internal diameter ($D_{gas}$) which is in the range of 3.5 mm to 4.5 mm.

9. The line according to claim 1, characterized in that the stabilization device is in spiral form and has a stabilization device diameter ($D_{spiral}$) which is in the range of 3.3 mm to 4.3 mm.

10. A delivery system for delivering a gaseous medium, in particular a gas from a refueling facility into a container at a refueling pressure of greater than 150 bar, comprising:
    a filling coupling, and
    a line including a hose, said hose being connectable between the filling coupling and the container, the line having a high-pressure line and a gas recirculation line, wherein the gas recirculation line is arranged coaxially inside the high-pressure line, characterized in that the gas recirculation line includes a stabilization device, the high-pressure line has a high-pressure line internal diameter ($D_{line}$) in the range of approximately 6.35 mm to approximately 19.05 mm, the gas recirculation line has a gas recirculation line internal diameter ($D_{gas}$) in the range of approximately 3.5 mm up to approximately half of the high-pressure line internal diameter ($D_{line}$), and the gas recirculation line has a gas recirculation line internal diameter selected to provide a selected predetermined flow rate.

11. The delivery system according to claim 10, further comprising a connection coupling between the filling coupling and the line, the connection coupling having at least one connection bore in the form of an diagonal bore in order to connect the gas recirculation line lying in the interior of the line to a recirculation line of the filling coupling and to connect the high-pressure line of the line to a high-pressure line of the filling coupling.

12. The delivery system according to claim 11, characterized in that the connection coupling is connected to the filling coupling.

13. The delivery system according to claim 11, characterized in that the connection coupling is connected to a rotary feedthrough.

14. The gas delivery system according to claim 13, characterized in that the rotary feedthrough comprises a rotary feedthrough gas recirculation line and a rotary feedthrough high-pressure line lying in the interior of the rotary feedthrough gas recirculation line.

15. The delivery system according to claim 10, characterized in that a connection coupling is provided between the filling coupling and the line, the connection coupling having at least one connection bore in the form of an diagonal bore in order to connect the gas recirculation line lying in the interior of the line to a gas outlet and to connect the high-pressure line of the line to a high-pressure line of the filling coupling.

16. The delivery system according to claim 10, characterized in that a connection coupling is provided between the line and the container, the connection coupling having at least one connection bore in the form of an diagonal bore in order to connect the gas recirculation line lying in the interior of the line to a gas outlet and to connect the high-pressure line of the line to a high-pressure line of the container.

17. A gas delivery system for use in a gas fueling station for motor vehicles, to deliver a gaseous medium into a container of a motor vehicle, at a refueling pressure of greater than 150 bar, comprising:
    a filling coupling, and
    a line including a hose, said hose being connectable between the filling coupling and the container, the line having a high-pressure line and a gas recirculation line, wherein the gas recirculation line is arranged coaxially inside the high-pressure line, characterized in that the gas recirculation line includes a stabilization device, the high-pressure line has a high-pressure line internal diameter ($D_{line}$) in the range of approximately 6.35 mm to approximately 19.05 mm, the gas recirculation line has a gas recirculation line internal diameter ($D_{gas}$) in the range of approximately 3.5 mm up to approximately half of the high-pressure line internal diameter ($D_{line}$), and the gas recirculation line has a gas recirculation line internal diameter selected to provide a selected predetermined flow rate.

18. The gas delivery system for use in a gas fueling station for motor vehicles according to claim 17, further comprising a connection coupling between the filling coupling and container of a motor vehicle, the connection coupling having at least one connection bore in the form of an diagonal bore in order to connect the high-pressure line of the line to a high-pressure line of the filling coupling.

* * * * *